US008647092B2

(12) United States Patent
Nakai et al.

(10) Patent No.: US 8,647,092 B2
(45) Date of Patent: Feb. 11, 2014

(54) HOT ISOTROPIC PRESSURE DEVICE

(75) Inventors: Tomomitsu Nakai, Takasago (JP); Makoto Yoneda, Takasago (JP); Itaru Masuoka, Takasago (JP); Katsumi Watanabe, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/566,281

(22) Filed: Aug. 3, 2012

(65) Prior Publication Data

US 2013/0071508 A1 Mar. 21, 2013

(30) Foreign Application Priority Data

Sep. 21, 2011 (JP) ................................ 2011-206123
Feb. 10, 2012 (JP) ................................ 2012-027320
Apr. 10, 2012 (JP) ................................ 2012-089264

(51) Int. Cl.
*B29C 43/10* (2006.01)
*B22F 3/15* (2006.01)

(52) U.S. Cl.
USPC .......... 425/78; 425/405.2; 425/815; 432/199; 219/400

(58) Field of Classification Search
USPC .............. 425/73–74, 77–78, 210, 405.2, 815; 432/199, 205, 233, 249; 219/400
See application file for complete search history.

(56) References Cited

U.S. PATENT DOCUMENTS

| | | | | | |
|---|---|---|---|---|---|
| 4,532,984 | A * | 8/1985 | Smith, Jr. | ...................... | 432/205 |
| 5,251,880 | A * | 10/1993 | Ishii et al. | ...................... | 266/44 |
| 6,514,066 | B1 * | 2/2003 | Bergman | .................. | 425/405.2 |
| 6,837,086 | B2 * | 1/2005 | Manabe et al. | ............... | 100/305 |
| 7,008,210 | B2 * | 3/2006 | Manabe et al. | ............... | 425/185 |
| 7,011,510 | B2 * | 3/2006 | Nakai et al. | ..................... | 425/78 |
| 8,449,279 | B2 * | 5/2013 | Nakai et al. | ..................... | 425/78 |
| 2011/0165283 | A1 | 7/2011 | Nakai et al. | | |

FOREIGN PATENT DOCUMENTS

JP 2007-309626 11/2007

* cited by examiner

*Primary Examiner* — Richard Crispino
*Assistant Examiner* — Thukhanh Nguyen
(74) *Attorney, Agent, or Firm* — Oblon, Spivak, McClelland, Maier & Neustadt, L.L.P.

(57) ABSTRACT

A hot isotropic pressure device including: a casing disposed inside a high-pressure container; a heating unit provided inside the casing and forms a hot zone around the treatment material, in which an isotropic pressure treatment is performed on the treatment material using a pressure medium gas. A cooling unit is provided to cool the hot zone by guiding the pressure medium gas, cooled while guided from the upper side toward the lower side at the outside of the casing, into the hot zone. The cooling unit includes a gas introducing unit which guides the pressure medium gas cooled at the outside of the casing from the lower portion of the high-pressure container to the upper portion of the hot zone without any intersection with the pressure medium gas inside the hot zone and introduces the pressure medium gas into the hot zone.

12 Claims, 9 Drawing Sheets

HOT ISOTROPIC PRESSURE DEVICE

BACKGROUND OF THE INVENTION

1. Field of the Invention

The present invention relates to a hot isotropic pressure device.

2. Description of the Related Art

A HIP method (a pressing method using a hot isotropic pressure device) is used to treat a subject treatment material such as a sintered product (ceramics or the like) or a casted product at a high temperature equal to or higher than a recrystallization temperature under a pressure medium gas of an atmosphere set to a high pressure of several tens to several hundreds of MPa, and has a feature that air pores remaining in the subject treatment material may disappear. For this reason, in the HIP method, it is verified that there are effects such as improvement in mechanical characteristics, a reduction of a variation in characteristics, and improvement in yield rate. Accordingly, nowadays, the HIP method is widely used in the industrial field.

Incidentally, there is a strong demand for promptly performing the treatment in the actual manufacture site. For this reason, it is necessary to perform a cooling step requiring time in a short time among the steps of the HIP treatment. Therefore, in the existing hot isotropic pressure device (hereinafter, referred to as a HIP device), various methods have been suggested in which a cooling speed is improved while evenly heating the inside of a furnace.

For example, US 2011/165283 discloses a HIP device including: a gas impermeable inner casing which is disposed inside a high-pressure container accommodating a subject treatment material so as to surround the subject treatment material; a gas impermeable outer casing which is disposed so as to surround the inner casing from the outside; and a heating unit which is provided inside the inner casing and forms a hot zone around the subject treatment material. In the HIP device, the inside of the inner casing is formed as the hot zone, and an isotropic pressure treatment is performed on the subject treatment material using a pressure medium gas stored inside the hot zone which is adiabatically maintained by the inner and outer casings.

In the HIP device, a first cooling unit and a second cooling unit are provided as cooling units which cool the inside of the hot zone (the subject treatment material) by circulating the pressure medium gas inside the high-pressure container.

That is, the first cooling unit performs a cooling operation by circulating the pressure medium gas along the first circulation flow, and the first circulation flow is used to guide the pressure medium gas guided between the inner casing and the outer casing from the lower side to the upper side to the outside of the outer casing at the upper portion of the outer casing, to cool the guided pressure medium gas while being guided along the inner peripheral surface of the high-pressure container from the upper side to the lower side, and to return the cooled pressure medium gas between the inner casing and the outer casing at the lower portion of the outer casing.

The second cooling unit performs a cooling operation by circulating the pressure medium gas along the second circulation flow, and the second circulation flow is used to circulate the pressure medium gas so that the pressure medium gas inside the hot zone is guided to the outside of the hot zone, the pressure medium gas guided to the outside is joined to the pressure medium gas compulsorily circulated by the first cooling unit so as to cool the pressure medium gas, and a part of the cooled pressure medium gas is returned into the hot zone.

In the hot isotropic pressure device, a part of the pressure medium gas flowing along the first circulation flow is joined to the second circulation flow from the lower side of the hot zone using a fan and an ejector, and the joined pressure medium gas performs a cooling operation while circulating inside the hot zone. Accordingly, a temperature difference caused between upper and lower portions of a furnace during the cooling operation is solved, whereby the inside of the furnace may be efficiently cooled.

In particular, in the container of the hot isotropic pressure device, since the high-temperature pressure medium gas is not directly guided out of the furnace, the inner peripheral surface of the container is not excessively heated. Further, in the compulsory circulation using the ejector, the high cooling speed may be realized. Furthermore, compared to the case where a fan is provided inside the hot zone, the furnace structure is not complex since the ejector without any limit in the type of material concerned with heat resistance or the like is used. Accordingly, there is no concern that the HIP device may increase in cost.

Further, JP 2007-309626A discloses a technique which performs a cooling step in a short time by extracting a pressure medium gas inside a high-pressure container to the outside of the container, cooling the pressure medium gas outside the container, and returning the pressure medium gas into the container.

SUMMARY OF THE INVENTION

The HIP device of US 2011/165283 has a feature that the second circulation flow is formed inside the furnace by the ejector so as to perform a cooling operation while evenly heating the inside of the furnace. However, in general, the pressure medium gas which flows along the first circulation flow flowing into the hot zone through the ejector is not easily mixed with the pressure medium gas inside the hot zone due to a large difference in temperature or density therebetween. That is, even when the low-temperature pressure medium gas flowing as the first circulation flow is made to be joined to the high-temperature pressure medium gas flowing as the second circulation flow, both pressure medium gases are not sufficiently mixed with each other. Thus, in the HIP device, there is a need to increase the flow rate of the ejector. As a result, a pressure difference (pressure loss) between the outlet side and the inlet side of the ejector or the fan increases, and hence a large electric motor for driving these is inevitably used. As a result, in the HIP device, a space for treating the subject treatment material is narrowed by the amount in which a large installation space needs to be spared for the fan or the electric motor.

The present invention is made in view of the above-described problems, and it is an object of the invention to provide a HIP device capable of efficiently cooling the inside of a treatment chamber (a hot zone) in a short time after a HIP treatment without narrowing the inside of the treatment chamber (the hot zone) of the HIP treatment.

In order to solve the above-described problems, the hot isotropic pressure device (the HIP device) of the invention takes the following technical configurations.

That is, according to an aspect of the invention, there is provided a hot isotropic pressure device including: a high-pressure container which accommodates a subject treatment material; a gas impermeable casing which is disposed inside the high-pressure container so as to surround the subject treatment material; a heating unit which is provided inside the casing and forms a hot zone around the subject treatment material so as to perform an isotropic pressure treatment on the subject treatment material using a pressure medium gas inside the hot zone; a cooling unit which guides the pressure medium gas, cooled while being guided from the upper side toward the lower side at the outside of the casing, into the hot zone so as to cool the hot zone; and a gas introducing unit which is provided in the cooling unit, wherein the gas introducing unit guides the pressure medium gas, cooled at the outside of the casing, from a lower portion of the high-pressure container to an upper portion of the hot zone without any intersection with the pressure medium gas inside the hot zone, and introduces the pressure medium gas into the hot zone.

Preferably, the gas introducing unit may include a conduit pipe which extends from the lower side of the hot zone to the upper portion of the hot zone and is opened at the upper portion of the hot zone, and a compulsory circulation unit which guides the pressure medium gas cooled at the outside of the casing to the upper portion of the hot zone by the conduit pipe.

Preferably, the casing may include an inner casing which is disposed so as to surround the subject treatment material and an outer casing which is disposed so as to surround the inner casing from the outside, and the inner and outer casings are provided with a distance therebetween. A rectification cylinder may be disposed inside the inner casing so as to divide a space inside the inner casing into inner and outer spaces and surround the hot zone. The cooling unit may include a first cooling unit which circulates the pressure medium gas so that the pressure medium gas, guided between the inner casing and the outer casing from the lower side toward the upper side, is guided to the outside of the outer casing at an upper portion of the outer casing, the guided pressure medium gas is cooled while being guided from the upper side toward the lower side along an inner peripheral surface of the high-pressure container, and the cooled pressure medium gas is returned between the inner casing and the outer casing at a lower portion of the outer casing, and a second cooling unit which circulates the pressure medium gas between the outside of the rectification cylinder and the inside of the rectification cylinder. The gas introducing unit may guide the pressure medium gas cooled by the first cooling unit to the upper portion of the hot zone so as to be joined to the pressure medium gas circulated by the second cooling unit.

In the hot isotropic pressure device with the above-described configuration, the second cooling unit may circulate the pressure medium gas so that the pressure medium gas inside the hot zone is guided from an upper portion of the rectification cylinder to the outside of the rectification cylinder and the pressure medium gas guided to the outside is returned from the lower side of the rectification cylinder into the hot zone. Alternatively, the second cooling unit may circulate the pressure medium gas so that the pressure medium gas outside the rectification cylinder is guided from an upper portion of the rectification cylinder into the hot zone and the pressure medium gas guided into the hot zone is returned from the lower side of the rectification cylinder to the outside of the hot zone.

Preferably, the conduit pipe may be provided along an outer peripheral surface or an inner peripheral surface of the rectification cylinder.

Preferably, the conduit pipe may be provided so as to penetrate a center portion of the rectification cylinder in the vertical direction.

Preferably, the heating unit may be divided into a plurality of heating units in the circumferential direction at the constant distance in the radial direction about the center of the hot zone, and the conduit pipe may be disposed between the plurality of heating units divided in the circumferential direction at a position where a distance from the center of the hot zone in the radial direction is equal to that of the heating unit.

Preferably, the hot isotropic pressure device may further include an external conduit pipe which is disposed so that a part of the pressure medium gas cooled by the first cooling unit is guided to the outside of the high-pressure container, is cooled at the outside of the high-pressure container, and is guided to the conduit pipe provided inside the high-pressure container again and is connected to a lower end portion of the conduit pipe, and the external conduit pipe may be provided with an external compulsory circulation unit which is provided outside the high-pressure container and compulsorily circulates the pressure medium gas inside the external conduit pipe.

Preferably, the external compulsory circulation unit may be provided separately from a compulsory circulation unit which is provided in the conduit pipe and guides the pressure medium gas cooled at the outside of the casing to the upper portion of the hot zone.

Preferably, a connection portion between the external conduit pipe and the conduit pipe may be provided with an ejector which suctions a part of the pressure medium gas circulated by the first cooling unit and mixes the suctioned pressure medium gas with the pressure medium gas cooled at the outside of the high-pressure container.

Preferably, the conduit pipe may be fixed to the inner casing or the heating unit provided in the inner casing, and the conduit pipe may be movable in the vertical direction with respect to the rectification cylinder while being supported by the inner casing or the heating unit.

According to the hot isotropic pressure device of the invention, the inside of the hot zone may be highly efficiently cooled in a short time after the HIP treatment without using a large compulsory circulation unit.

Figure 1:
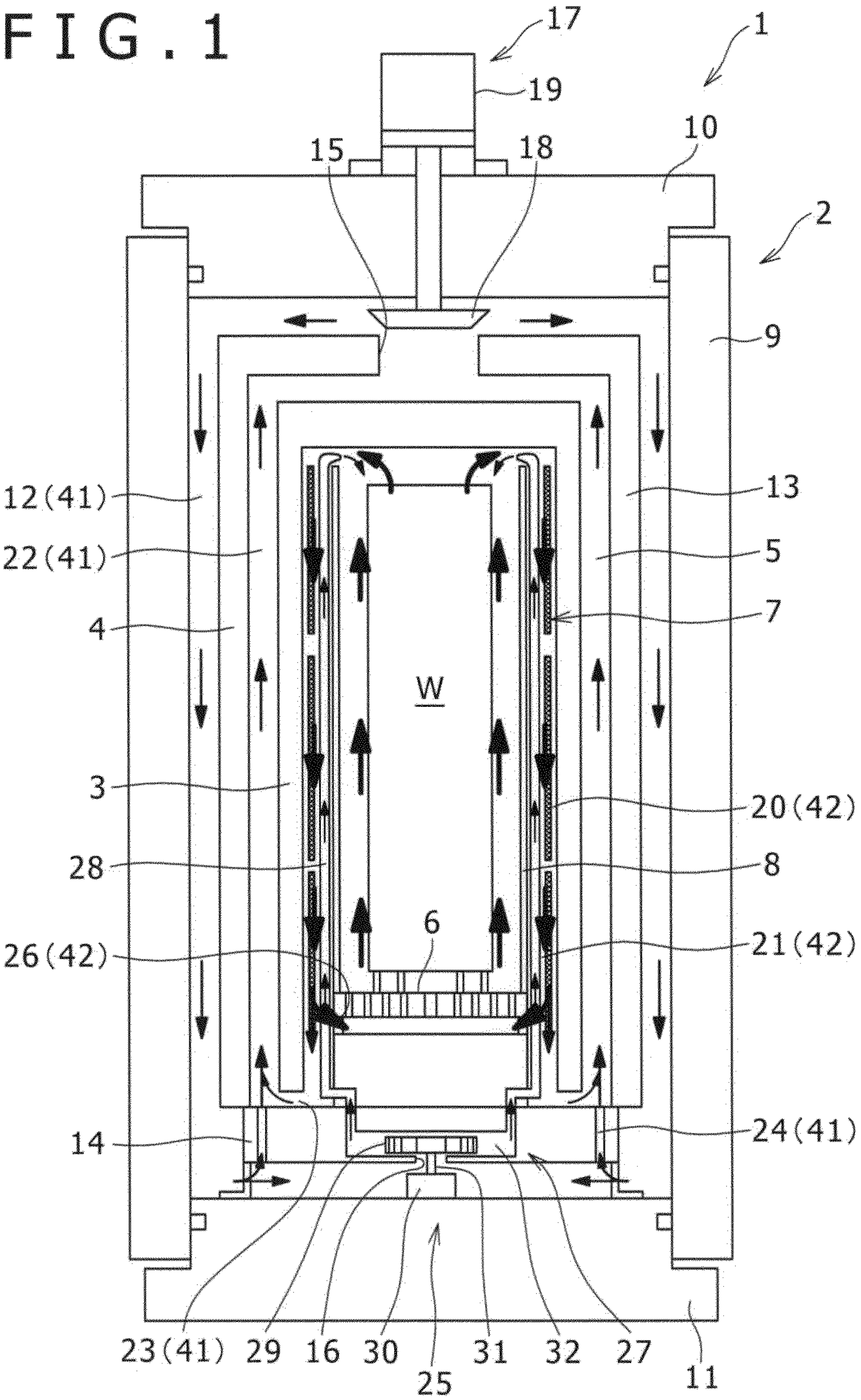
FIG. 1 is a front cross-sectional view illustrating a hot isotropic pressure device of a first embodiment.

DESCRIPTION OF THE PREFERRED EMBODIMENTS (First Embodiment)

Hereinafter, a first embodiment of a hot isotropic pressure device according to the invention will be described in detail by referring to the drawings.

FIG. 1 illustrates a hot isotropic pressure device 1 (hereinafter, referred to as a HIP device 1) of the first embodiment. The HIP device 1 includes a high-pressure container 2 which accommodates a subject treatment material W, and further includes a gas impermeable inner casing 3 and a gas impermeable outer casing 4 which are provided inside the high-pressure container 2, where the gas impermeable inner casing 3 is disposed so as to surround the subject treatment material W, and the gas impermeable outer casing 4 is disposed so as to surround the inner casing 3 from the outside. A heat insulating layer 5 is provided between the inner casing 3 and the outer casing 4, and the inside of the inner casing 3 is adiabatically isolated from the outside by the heat insulating layer 5. In the case of the first embodiment, the inner casing 3 and the outer casing 4 constitute a gas impermeable casing.

Further, the HIP device 1 further includes a product table 6 and a heating unit (heater) 7 which are provided inside the inner casing 3, where the product table 6 supports the subject treatment material W, and the heating unit 7 heats a pressure medium gas. Further, the subject treatment material W is placed on the product table 6. Then, a rectification cylinder 8 is provided between the heating unit 7 and the subject treatment material W so as to separate both constituents from each other. The HIP device 1 supplies the pressure medium gas heated by the heating unit 7 provided outside the rectification cylinder 8 from the lower side of the rectification cylinder 8 into the rectification cylinder 8, and forms an atmosphere (hereinafter, referred to as a hot zone) of the pressure medium gas around the subject treatment material W by the high-temperature pressure medium gas introduced into the rectification cylinder 8 so that the hot zone surrounds the subject treatment material W, whereby a hot isotropic pressure treatment (hereinafter, referred to as a HIP treatment) may be performed on the subject treatment material W inside the hot zone.

Hereinafter, the respective members constituting the HIP device 1 will be described in detail.

As illustrated in FIG. 1, the high-pressure container 2 includes a container body 9 which is formed in a cylindrical shape about the axis along the vertical direction, a cover body 10 which blocks the upper (the upper side of the drawing paper of FIG. 1) opening of the container body 9, and a bottom body 11 which blocks the lower (the lower side of the drawing paper of FIG. 1) opening of the container body 9. A seal is provided between the opening of the container body 9 and the cover body 10 and between the opening and the bottom body 11, so that a hollow space is formed inside the high-pressure container 2 so as to be air-tightly isolated from the outside. A supply pipe or a discharge pipe (not illustrated) is connected to the high-pressure container 2, so that the high-temperature and high-pressure pressure medium gas (an argon gas or a nitrogen gas which rises in pressure up to about 10 to 300 MPa so that the HIP treatment may be performed) may be supplied into the container or discharged from the container through the supply pipe and the discharge pipe.

The outer casing 4 is a covered cylindrical member which is disposed inside the high-pressure container 2, and is formed of a gas impermeable heat-resistant material such as stainless steel, nickel alloy, molybdenum alloy, or graphite so as to match the temperature condition of the HIP treatment. The outer casing 4 is disposed with a distance from the inner peripheral surface of the high-pressure container 2 in the inward radial direction, and a gap is formed between the outer peripheral surface of the outer casing 4 and the inner peripheral surface of the high-pressure container 2. The gap is formed as an outer passageway 12 through which the pressure medium gas may circulate along the vertical direction.

Specifically, the outer casing 4 includes an outer casing body 13 which has a reverse cup shape opened downward and an outer casing bottom body 14 which blocks the lower opening of the outer casing body 13. The upper portion of the outer casing body 13 is provided with an upper opening portion 15 which guides the pressure medium gas inside the outer casing 4 from the lower side toward the upper side so that the pressure medium gas may be guided to the outside of the outer casing 4. The upper opening portion 15 is provided with a first valve unit 17 which blocks the circulation of the pressure medium gas flowing outward from the inside of the outer passageway 12.

Further, as in the upper opening portion 15, the outer periphery of the outer casing bottom body 14 is provided with a second circulation hole 24 which circulates the pressure medium gas present at the outside (an inner passageway 22 to be described later) of the outer casing 4 inward along the vertical direction. The second circulation hole 24 is formed so as to penetrate the outer periphery of the outer casing bottom body 14 in the vertical direction, so that a part of the pressure medium gas circulating in the outer passageway 12 flows into the inner passageway 22.

Further, the center side of the outer casing bottom body 14 is provided with a lower opening portion 16 which guides the remaining pressure medium gas circulating in the outer passageway 12 into the hot zone, and the lower opening portion 16 is provided with a compulsory circulation unit 25 to be described later.

The first valve unit 17 includes a lid member 18 which is formed in a size capable of blocking the upper opening portion 15 of the outer casing 4, and a movement unit 19 which moves the lid member 18 in the vertical direction. In the first valve unit 17, the upper opening portion 15 is opened and closed by moving the lid member 18 up and down in the vertical direction using the movement unit 19 which is provided at the outside of the high-pressure container 2, so that the circulation and the interruption of the pressure medium gas may be arbitrarily switched.

The inner casing 3 is a casing which is disposed inside the outer casing 4 and is formed in a substantially cylindrical shape along the vertical direction. The inner casing 3 is provided with a distance from the inner peripheral surface of the outer casing 4 in the inward radial direction, so that a gap may be formed between the inner casing 3 and the outer casing 4. In the gap, a gas permeable heat insulating layer 5 is disposed which is formed of a porous material such as a ceramic fiber or a graphitic material obtained by splicing a carbon fiber. Also, the inner passageway 22 is formed so that the pressure medium gas permeating through the heat insulating layer 5 may circulate along the vertical direction.

The inner casing 3 is formed in a reverse cup shape using a heat-resistant material as in the outer casing 4, and is disposed so as to block the lower opening using the outer casing bottom body 14. In other words, the outer casing bottom body 14 is used to block the lower opening of the outer casing body 13 and the lower opening of the body of the inner casing 3. Then, a gap is formed between the lower portion of the inner casing 3 and the outer casing bottom body 14 in the vertical direction, and the gap is formed as a first circulation hole 23 which circulates the pressure medium gas present inside the inner casing 3 toward the outside (the inner passageway 22).

In the inside of the inner casing 3, the heating unit 7 and the rectification cylinder 8 are sequentially provided from the outside in the radial direction, and the inside of the rectification cylinder 8 is formed as the hot zone. Next, the internal structure of the inner casing 3 will be described.

The heating unit 7 includes three heater elements which are arranged in parallel along the vertical direction. The heating unit 7 is disposed with a distance from the inner peripheral surface of the inner casing 3 in the inward radial direction, and the rectification cylinder 8 is disposed with a longer distance from the heating unit 7 in the inward radial direction. Then, the inside and the outside of the heating unit 7 (the heater) are respectively provided with gas circulation paths which circulate the pressure medium gas in the vertical direction.

An outer gas circulation path 20 which is provided at the outside of the heating unit 7 extends in the vertical direction along the inner peripheral surface of the inner casing 3, and the lower end thereof communicates with the first circulation hole 23. Then, the pressure medium gas inside the hot zone may be guided to the outer passageway 12 through the first circulation hole 23. Further, the inner gas circulation path 21 which is provided at the inside of the heating unit 7 extends in the vertical direction along the inner peripheral surface of the rectification cylinder 8, and communicates with a gas introducing hole 26 which is provided at the lower side of the rectification cylinder 8. Then, the pressure medium gas may be returned into the hot zone through the gas introducing hole 26.

The rectification cylinder 8 is formed in a cylindrical shape by a gas impermeable plate material, and the opened upper end extends to a position which is slightly lower than the inner peripheral surface (the upper surface) of the inner casing 3. That is, a gap is formed between the upper end of the rectification cylinder 8 and the inner casing 3 in the vertical direction, so that the pressure medium gas present at the inside (the inside of the hot zone) of the rectification cylinder 8 may be guided to the gas circulation path (any one of the inner gas circulation path 21 and the outer gas circulation path 20) provided outside the rectification cylinder 8 through the gap.

At the lower side of the rectification cylinder 8, the product table 6 which places the subject treatment material W thereon is provided. The product table 6 is formed of a porous plate through which the pressure medium gas may permeate, so that the pressure medium gas may be guided from the lower side toward the upper side through the product table 6. At the upper side of the product table 6, the subject treatment material W is disposed so as not to directly contact the upper surface of the product table 6 with a spacer therebetween (in a lifted state).

Further, in the outer peripheral surface of the rectification cylinder 8, the gas introducing hole 26 is provided at a position much lower than the product table 6. The gas introducing hole 26 is formed so as to penetrate the side wall of the rectification cylinder 8, so that the pressure medium gas of the inner gas circulation path 21 may be introduced into the rectification cylinder 8. That is, the pressure medium gas which is introduced into the rectification cylinder 8 through the gas introducing hole 26 permeates through the product table 6 and flows to the upper side of the product table 6, thereby performing the HIP treatment in the hot zone formed above the product table 6.

Incidentally, the HIP device 1 of the invention is provided with a first cooling unit and a second cooling unit which will be described later and serve as cooling units for cooling the inside of the hot zone.

The first cooling unit performs a cooling operation while circulating the pressure medium gas along the first circulation flow 41. The first circulation flow 41 circulates the pressure medium gas so that the pressure medium gas, which is guided from the lower side toward the upper side of the inner passageway 22 formed between the outer casing 4 and the inner casing 3, is guided from the upper opening portion 15 of the outer casing 4 into the outer passageway 12, the guided pressure medium gas is cooled by being brought into contact with the high-pressure container 2 while being guided along the outer passageway 12 from the upper side toward the lower side, and the cooled pressure medium gas is returned from the second circulation hole 24 of the outer casing 4 to the inner passageway 22.

On the other hand, the second cooling unit performs a cooling operation by circulating the pressure medium gas along a second circulation flow 42 which circulates the pressure medium gas so that a part of the pressure medium gas inside the hot zone is guided to the outside of the hot zone, the pressure medium gas guided to the outside is cooled by being joined to the pressure medium gas compulsorily circulated by the first cooling unit, and a part of the cooled pressure medium gas is returned to the hot zone.

Incidentally, in a case where a part of the low-temperature pressure medium gas (flowing along the first circulation flow 41) cooled by the first cooling unit is guided into the hot zone and is joined to the high-temperature pressure medium gas (flowing along the second circulation flow 42) used by the second cooling unit, since there is a large difference in density between the pressure medium gases having a temperature difference in this way, the pressure medium gases may not be easily mixed with each other, so that both pressure medium gases are not sufficiently mixed with each other. That is, a compulsory circulation unit such as an ejector or a fan needs to be used in order to mix the pressure medium gas of the first cooling unit and the pressure medium gas of the second cooling unit which are not easily mixed with each other. As a result, although there is a concern that a large difference in pressure between the outlet and the inlet of the ejector may occur or an increase in cost of the device may occur, in the case of the existing device, there is a problem that a large fan 29 or a large electric motor needs to be used.

Therefore, the HIP device 1 of the invention includes a gas introducing unit 27 which introduces the pressure medium gas (a part of the pressure medium gas cooled by the first cooling unit) cooled at the outside of the outer casing 4 from the upper portion of the hot zone into the hot zone.

Specifically, the gas introducing unit 27 includes a conduit pipe 28 which extends from the lower side of the hot zone to the upper side of the hot zone and is opened at the upper portion of the hot zone, and the compulsory circulation unit 25 which guides the pressure medium gas cooled at the outside of the casing to the upper side of the hot zone along the conduit pipe 28.

Next, the conduit pipe 28 and the compulsory circulation unit 25 constituting the gas introducing unit 27 of the first embodiment will be described in detail.

The compulsory circulation unit 25 is provided in the lower opening portion 16 of the outer casing bottom body 14, and circulates the pressure medium gas of the outer passageway 12 by compulsorily introducing the pressure medium gas into the hot zone. The compulsory circulation unit 25 of the embodiment includes a motor 30 which is provided in the bottom body 11 of the high-pressure container 2, a shaft portion 31 which extends from the motor 30 through the lower opening portion 16 in the vertical direction, and the fan 29 which is attached to the upper end of the shaft portion 31. The fan 29 is accommodated in a fan accommodating portion 32 which is formed inside the outer casing bottom body 14, and the lower opening portion 16 is formed so that the fan accommodating portion 32 and the outer passageway 12 communicate with each other. Then, the fan 29 rotates about the shaft (the shaft portion 31) which extends in the vertical direction so as to pass through the lower opening portion 16, thereby compulsorily generating a flow in the pressure medium gas so as to be directed from the lower side toward the upper side.

That is, in the compulsory circulation unit 25, when the fan 29 is rotated by the motor 30 through the shaft portion 31, the pressure medium gas of the outer passageway 12 passes through the lower opening portion 16, so that it compulsorily flows into the fan accommodating portion 32. Then, the pressure medium gas which flows into the fan accommodating portion 32 is sent to the upper portion of the hot zone through the conduit pipe 28, and the pressure medium gas flows from the upper portion of the hot zone, so that the pressure medium gas is used to cool the inside of the hot zone. Furthermore, as the example of the compulsory circulation unit 25, a pump or the like may be used in addition to the fan.

The conduit pipe 28 is used to send the pressure medium gas flowing into the fan accommodating portion 32 to the upper portion of the hot zone, and is formed of a pipe material which has a hollow portion formed therein so as to guide the pressure medium gas therethrough so that it does not intersect the pressure medium gas of the hot zone without any leakage. The lower end of the conduit pipe 28 is opened at the fan accommodating portion 32, and the pressure medium gas of the fan accommodating portion 32 may be received from the lower opening into the pipe. Further, the conduit pipe 28 extends from the fan accommodating portion 32 (the lower side of the hot zone) to the upper portion of the hot zone along the outer peripheral surface (the vertical direction) of the rectification cylinder 8.

Specifically, the conduit pipe 28 extends upward from the opening (the lower opening) formed in the upper surface of the fan accommodating portion 32, is bent in the outward radial direction inside the rectification cylinder 8, is bent upward again after reaching the outer peripheral surface of the rectification cylinder 8, and then extends in a straight shape to the upper portion of the hot zone along the outer peripheral surface of the rectification cylinder 8. Then, the upper end of the conduit pipe 28 is opened toward the upper portion of the hot zone.

That is, the upper end of the conduit pipe 28 may be bent toward the inside of the hot zone from the outside to the inside in the radial direction, and the front end of the conduit pipe 28 is formed in a tapered shape like a nozzle. In this way, when the front end of the conduit pipe 28 is formed in a nozzle shape, the pressure medium gas ejected from the front end of the conduit pipe 28 is mixed with the pressure medium gas moving upward inside the hot zone by causing a countercurrent contact therebetween. Accordingly, it is possible to reliably mix the pressure medium gas of the first cooling unit and the pressure medium gas of the second cooling unit (the pressure medium gases having a large temperature difference therebetween) which are not easily mixed with each other.

Furthermore, in the embodiment, two conduit pipes 28 are disposed at the symmetric positions (the positions obtained by the rotation of 180° about the center) with the center of the rectification cylinder 8 interposed therebetween, but one conduit pipe or three or more conduit pipes may be disposed. Further, plural conduit pipes 28 may not be evenly disposed.

Next, a method of cooling the inside of the hot zone using the HIP device 1 of the invention, in other words, a cooling method of the HIP device 1 of the invention will be described.

As illustrated in FIG. 1, when the HIP treatment is performed by the HIP device 1 with the above-described configuration, the lid member 18 of the first valve unit 17 is moved downward so as to block the upper opening portion 15 of the outer casing 4. In this way, the circulation of the pressure medium gas from the upper opening portion 15 to the outer passageway 12 is interrupted. Then, when the heating unit 7 is operated in this state, the pressure medium gas inside the hot zone which is surrounded by the heat insulating layer 5 is heated, so that the HIP treatment may be performed on the subject treatment material W.

After the HIP treatment is performed on the subject treatment material W in this way, the inside of the hot zone is cooled in a short time using the first cooling unit and the second cooling unit in order to extract the subject treatment material W.

First, when the cooling operation is performed using the first cooling unit, the upper opening portion 15 is made to be opened (in an opened state) using the first valve unit 17. Then, the pressure medium gas of the inner passageway 22 (between the outer casing 4 and the inner casing 3) moves from the lower side to the upper side as depicted by the arrow of the drawing, and eventually moves from the upper opening portion 15 to the outer passageway 12 at the upper end of the inner passageway 22. In this way, the pressure medium gas which moves to the outer passageway 12 is cooled by being brought into contact with the inner peripheral surface of the high-pressure container 2, moves from the upper side to the lower side along the outer passageway 12, and eventually returns from the lower second circulation hole 24 of the outer passageway 12 to the inner passageway 22. In this way, the pressure medium gas sequentially circulates in the outer passageway 12 and the inner passageway 22 of the first circulation flow 41, thereby cooling the inside of the hot zone using the first cooling unit.

On the other hand, when the cooling operation is performed using the second cooling unit, a part of the pressure medium gas cooled by the first cooling unit is first returned into the hot zone using the gas introducing unit 27.

That is, when the fan 29 of the compulsory circulation unit 25 is rotated, the pressure medium gas of the outer passageway 12 is received in the fan accommodating portion 32 from the lower opening portion 16 of the outer casing bottom body 14. In this way, the pressure medium gas which is received in the fan accommodating portion 32 is sent to the upper portion of the hot zone through the conduit pipe 28, and is ejected from the front end of the conduit pipe 28 into the hot zone. In this way, the pressure medium gas which is ejected into the hot zone from the front end of the conduit pipe 28 contacts the pressure medium gas moving upward inside the hot zone by the countercurrent contact, thereby efficiently cooling the pressure medium gas of the upper portion of the hot zone.

In this way, the pressure medium gas which is cooled at the upper portion of the hot zone flows to the outside of the rectification cylinder 8 through the gap formed between the upper end of the rectification cylinder 8 and the inner casing 3, and flows from the upper side to the lower side through the inner and outer gas circulation paths. The pressure medium gas which is guided to the lower side through the inner gas circulation path 21 returns from the gas introducing hole 26 into the rectification cylinder 8, and moves upward inside the hot zone, thereby forming a flow circulating at the inside and the outside of the hot zone.

On the other hand, the pressure medium gas which is guided downward through the outer gas circulation path 20 returns from the first circulation hole 23 of the inner casing 3 into the inner passageway 22 of the first cooling unit, is cooled along the flow of the first cooling unit, and is returned into the hot zone again using the gas introducing unit 27.

In this way, at the upper portion of the hot zone, the low-temperature pressure medium gas which is ejected from the front end of the conduit pipe 28 into the hot zone and the high-temperature pressure medium gas moving upward inside the hot zone are reliably mixed with each other by the countercurrent contact. In particular, the high-temperature pressure medium gas and the low-temperature pressure medium gas having a large difference in density are not easily mixed with each other in general, but the pressure medium gases may be efficiently mixed with each other through the countercurrent contact. Thus, in the HIP device 1, the inside of the treatment chamber (the hot zone) may be efficiently cooled in a short time after the HIP treatment without using a large compulsory circulation unit (for example, an ejector or the like) inside the device.

In addition, since the pressure medium gas of which the temperature is decreased by the heat exchange with the ejected low-temperature pressure medium gas is heated to some extent while passing through the inner gas circulation path 21 from the upper portion of the hot zone and contacts the subject treatment material W, a rapid cooling state does not occur by the direct contact of the low-temperature pressure medium gas with the inside of the rectification cylinder 8 or the subject treatment material W, and the safety for the HIP device 1 improves.

On the other hand, the flow of the pressure medium gas in the second cooling unit may have a direction completely opposite to the above-described direction. That is, the pressure medium gas may be circulated by the second cooling unit so that the pressure medium gas outside the rectification cylinder 8 is guided from the upper portion of the rectification cylinder 8 into the hot zone and the pressure medium gas guided into the hot zone returns from the lower side of the rectification cylinder 8 to the outside of the hot zone. The flow of the pressure medium gas may occur, for example, when the temperature inside the rectification cylinder 8 is lower than the temperature outside the rectification cylinder as in the case where the amount of the subject treatment material W is comparatively small.

That is, since the temperature inside the rectification cylinder 8 is generally higher than the temperature outside the rectification cylinder 8, the above-described flow direction of the heat medium gas is obtained. However, for example, when there is a difference in thermal capacity or surface area between the subject treatment material W inside the rectification cylinder 8 and the heating unit 7 (the heater) outside the rectification cylinder 8, the temperature inside the rectification cylinder 8 may be lower than the temperature outside the rectification cylinder 8.

Figure 4:
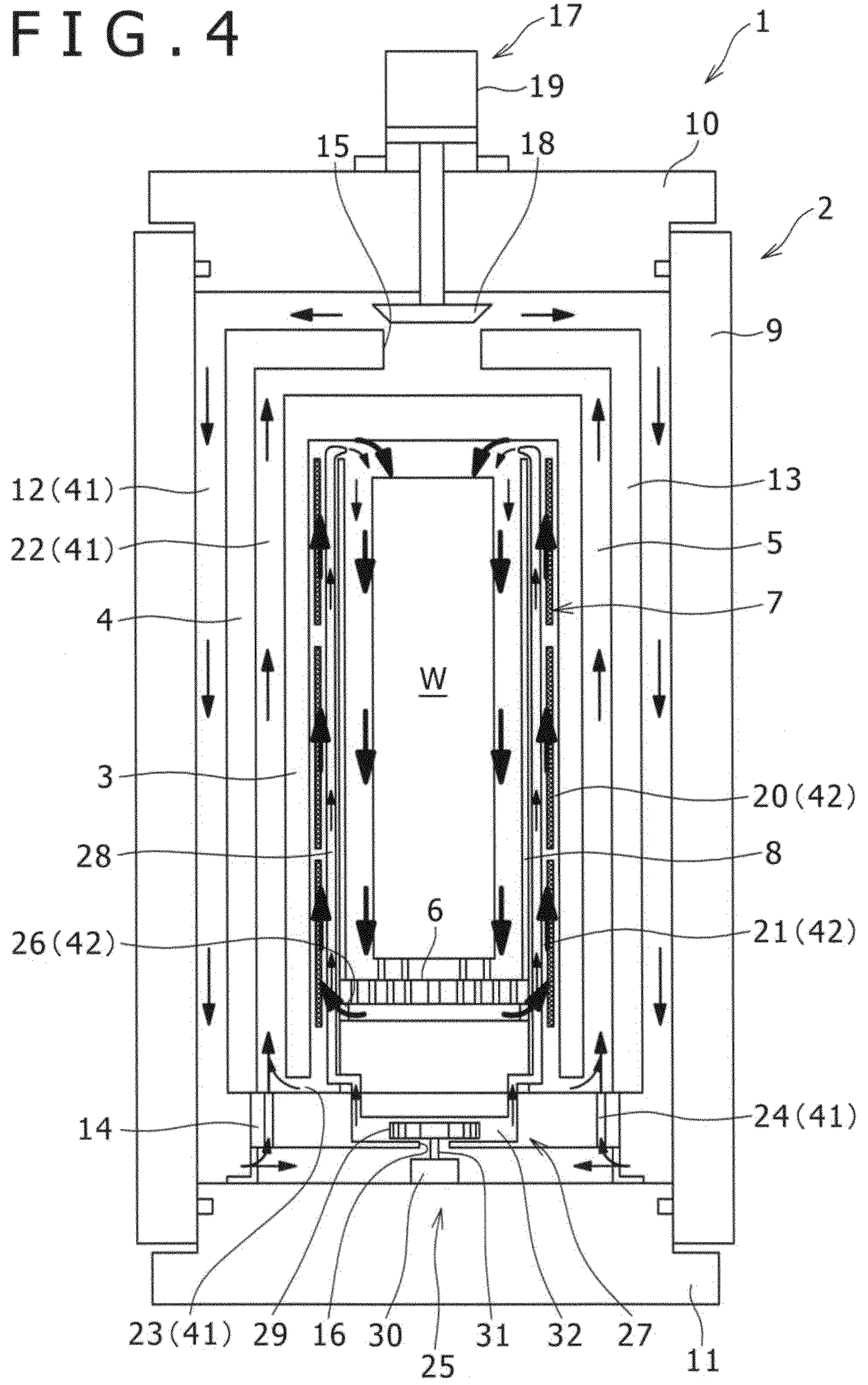
FIG. 4 is a front cross-sectional view illustrating a modified example of the hot isotropic pressure device of the first embodiment.

In such a case, as illustrated in FIG. 4, the direction of the second circulation flow 42 caused by the second cooling unit is completely reversed to that of the case of FIG. 1, and the first circulation flow 41 and the second circulation flow 42 are mixed with each other at the upper portion of the rectification cylinder 8 by the parallel current mixture (the mixture in the same direction). The inventors actually know that the above-described same operation and effect are obtained even when the heat medium gas flows for the parallel current mixture in the above-described direction.

Further, even in a second or third embodiment to be described later, the substantially same operation and effect may be obtained even when the heat medium gas flows in two directions or any one thereof by the second cooling unit.

(Second Embodiment)

Next, the HIP device 1 of a second embodiment will be described.

Figure 2:
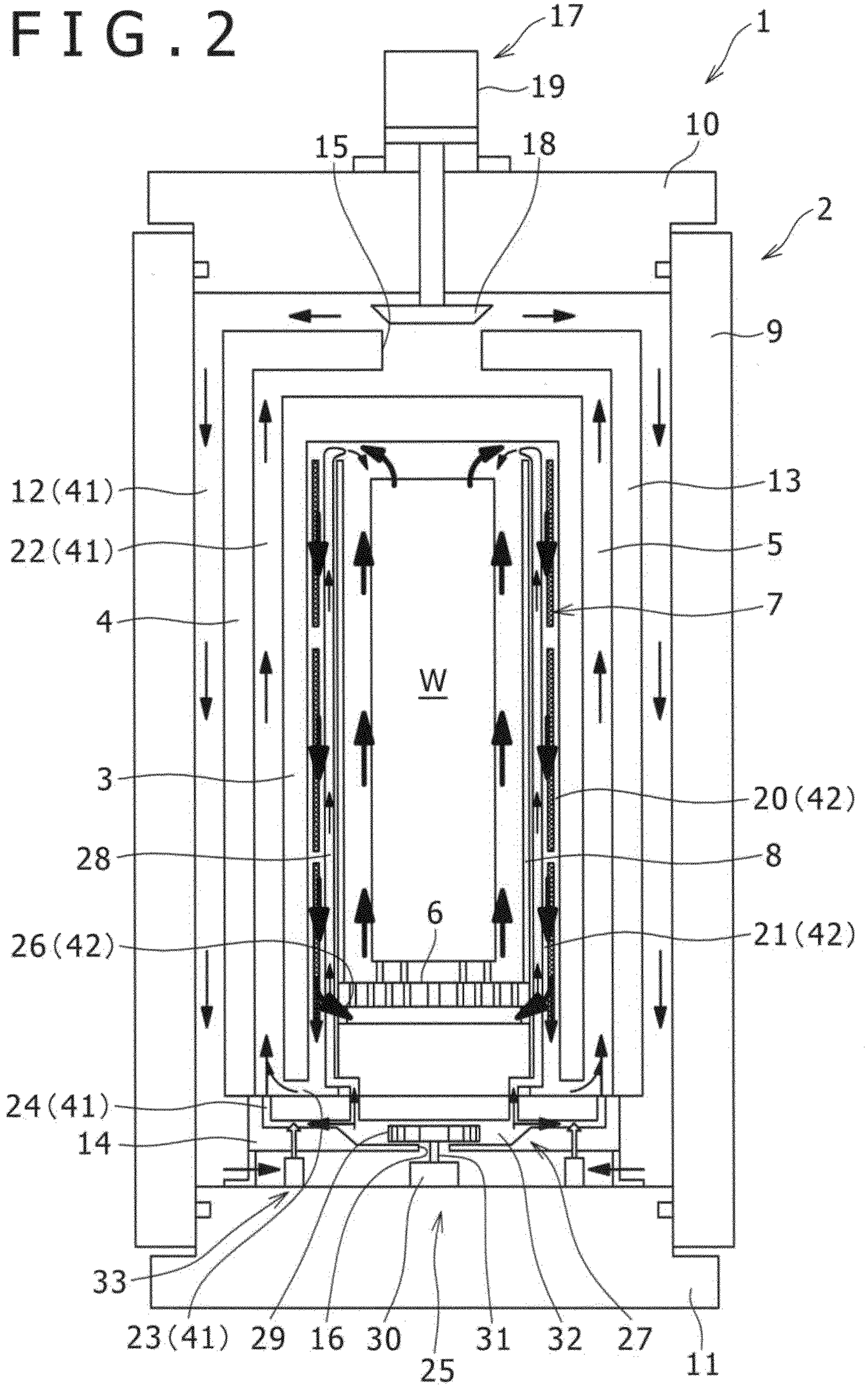
FIG. 2 is a front cross-sectional view illustrating a hot isotropic pressure device of a second embodiment.

As illustrated in FIG. 2, as not in the case of the HIP device 1 of the first embodiment, in the HIP device 1 of the second embodiment, a valve unit (a second valve unit 33) is newly provided which adjusts a ratio between the flow rate of the pressure medium gas flowing along the first circulation flow 41 and the flow rate of the pressure medium gas flowing along the second circulation flow 42.

Specifically, instead of the installation position of the second circulation hole 24, a second valve unit 33 (a throttle valve unit) may be newly provided in the second circulation hole 24. That is, in the HIP device 1 illustrated in FIG. 2, the second circulation hole 24 is opened to both the outer casing bottom body 14 and the fan accommodating portion 32, and a part of the pressure medium gas received in the fan accommodating portion 32 may flow into the inner passageway 22. Then, in the course of the second circulation hole 24, the second valve unit 33 is provided which closes or opens the second circulation hole 24 so as to adjust the flow rate of the pressure medium gas flowing from the fan accommodating portion 32 into the inner passageway 22.

When the second valve unit 33 is used, the flow rate of the pressure medium gas flowing from the fan accommodating portion 32 into the inner passageway 22 may be adjusted, and then the ratio (the flow rate ratio) between the flow rate of the pressure medium gas flowing along the first circulation flow 41 and the flow rate of the pressure medium gas flowing along the second circulation flow 42 may be arbitrarily changed, thereby further precisely controlling the cooling speed.

Furthermore, when the flow rate ratio between the flow rate of the pressure medium gas flowing along the first circulation flow 41 and the flow rate of the pressure medium gas flowing along the second circulation flow 42 is controlled in this way, a fan or a pump which adjusts the flow rate of the pressure medium gas flowing along the first circulation flow 41 may be provided on the path of the first circulation flow 41. Further, the second valve unit 33 may be provided in the second circulation flow 42 or may be provided in both the first circulation flow 41 and the second circulation flow 42.

(Third Embodiment)

Next, the HIP device 1 of a third embodiment will be described.

Figure 3:
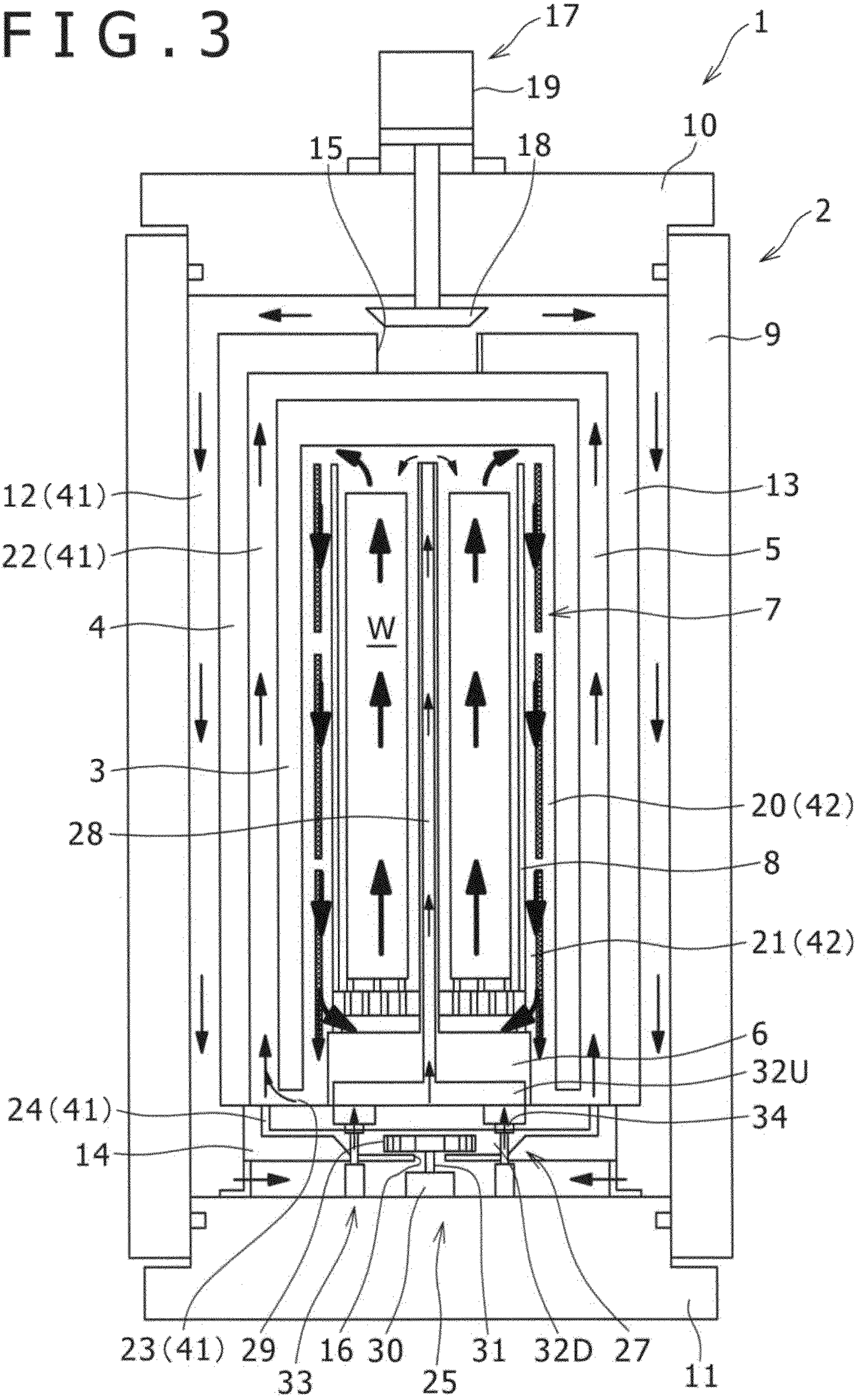
FIG. 3 is a front cross-sectional view illustrating a hot isotropic pressure device of a third embodiment.

As illustrated in FIG. 3, in the HIP device 1 of the third embodiment, only one conduit pipe 28 is provided so as to penetrate the center portion of the rectification cylinder 8 in the vertical direction instead providing plural conduit pipes 28 along the outer peripheral surface or the inner peripheral surface of the rectification cylinder 8. The center portion includes not only the geometric center of the cross section of the rectification cylinder 8, but also the portion deviating from the center by a certain degree, and indicates the center portion excluding the peripheral edge portion of the cross section.

That is, the fan accommodating portion 32 of the HIP device 1 is divided into two upper and lower chambers, so that the pressure medium gas may flow from a lower fan accommodating portion 32D to an upper fan accommodating portion 32U. Further, one conduit pipe 28 is opened to the center side of the upper fan accommodating portion 32U, and the conduit pipe 28 extends upward so as to penetrate the center portion of the rectification cylinder 8 in the vertical direction. Further, a communication hole 34 which communicates two upper and lower chambers with each other is provided in a partition wall dividing the upper fan accommodating portion 32U and the lower fan accommodating portion 32D from each other, and the communication hole 34 is provided with the second valve unit 33 which may interrupt the flow of the pressure medium gas from the lower fan accommodating portion 32D to the upper fan accommodating portion 32U.

In this way, when the conduit pipe 28 is disposed at the center side of the rectification cylinder 8, the utilization ratio of the space may be improved by taking the wide installation space for the subject treatment material W compared to the case where the conduit pipe 28 is disposed along the outer peripheral surface or the inner peripheral surface of the rectification cylinder 8. The HIP device 1 is particularly preferable for the case where plural small treatment materials are stacked.

Further, since the low-temperature gas may be discharged from the conduit pipe 28 to the position close to the hottest center axis in the hot zone, the cooling efficiency improves.

(Fourth Embodiment)

Next, the HIP device 1 of a fourth embodiment will be described.

In the HIP device 1 of the first embodiment to the third embodiment, a method of disposing the conduit pipe 28 in the space between the inner casing 3 and the rectification cylinder 8 or a method of disposing the conduit pipe 28 in the inner space of the rectification cylinder 8 is described. However, when the conduit pipe 28 is disposed as in the embodiment, there is a need to ensure a space for providing the conduit pipe 28 by widening the gap between the inner casing 3 and the rectification cylinder 8 or the inner space of the rectification cylinder 8. That is, in order to ensure the space for providing the conduit pipe 28, the space for accommodating the subject treatment material W is sacrificed, and hence there is also a certain degree of limit in the size of the hot zone or the subject treatment material W which may be treated.

Therefore, in the HIP device 1 of the fourth embodiment, plural heating units 7 are disposed in the circumferential direction with a constant distance from the center of the hot zone (the rectification cylinder 8), and the conduit pipe 28 is disposed between the heating units 7 divided (circumferentially divided) in the circumferential direction so that the distance from the center of the hot zone is the same as that of the heating unit 7. In this way, since the conduit pipe 28 is disposed at the same position in the radial direction as that of the heating unit 7 which is necessarily provided in the HIP device 1, even when the conduit pipe 28 is provided, the space of the hot zone does not particularly decrease in size, and the size of the subject treatment material W which may be treated does not need to be decreased in size.

Next, the structure of the HIP device 1 of the fourth embodiment will be described in detail by referring to FIGS. 5 to 9.

Figure 5:
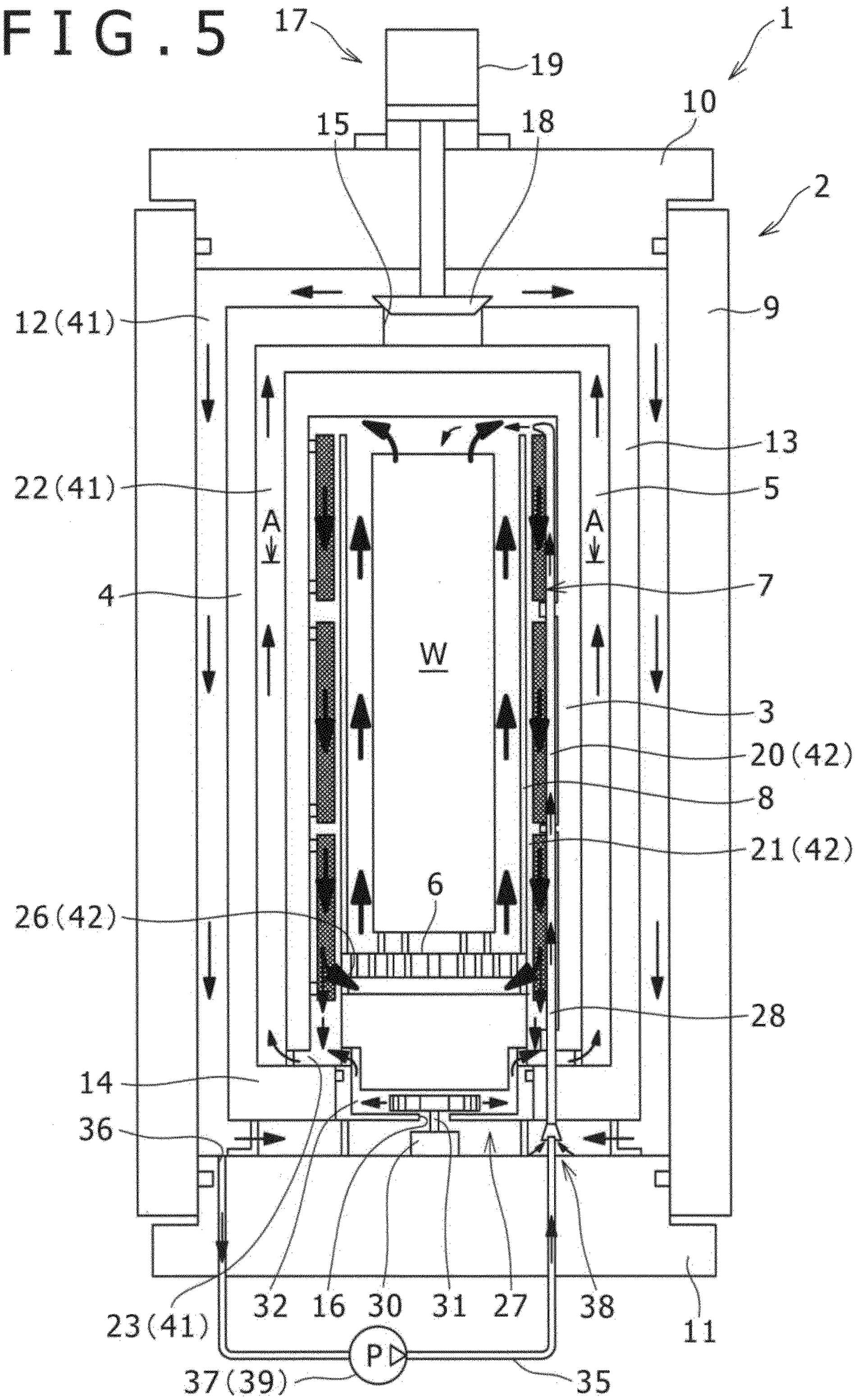
FIG. 5 is a front cross-sectional view illustrating a hot isotropic pressure device of a fourth embodiment.
Figure 6:
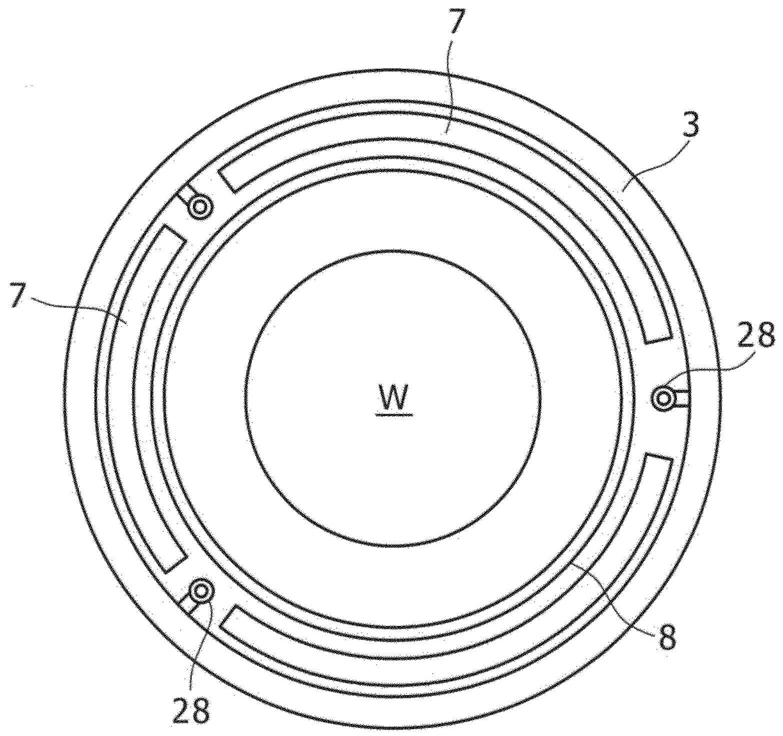
FIG. 6 is a cross-sectional view taken along the line A-A of FIG. 5.

As illustrated in FIGS. 5 and 6, as in the other embodiments, the HIP device of the fourth embodiment includes the conduit pipe 28 which guides a part of the pressure medium gas flowing along the first circulation flow 41 to the upper portion of the rectification cylinder 8 (the hot zone). The conduit pipe 28 which is provided in the HIP device 1 of the fourth embodiment is different from those of the other embodiments in that plural conduit pipes 28 and plural heating units 7 are provided and the conduit pipe 28 is disposed at the position where the distance from the center of the hot zone is equal to that of the heating unit 7, in other words, the conduit pipes 28 and the heating units 7 are disposed in a ring shape (a concentric shape) around the hot zone in the plan view. The conduit pipes 28 may be attached to the heating unit 7 (the heater element) or a support structure such as the inner casing 3 (the heat insulating layer 5) which supports the heating units 7.

That is, as illustrated in the plan view of FIG. 6, the heating unit 7 which is provided in the HIP device 1 of the fourth embodiment has a structure in which the heater element formed in a substantially cylindrical plate shape is divided into plural segments in the circumferential direction, and the respective divided heater elements are disposed in the circumferential direction with a distance therebetween. In the example illustrated in the drawing, the heating unit 7 is divided into three segments in the circumferential direction about the center of the hot zone, and each conduit pipe 28 is disposed between the adjacent heating units 7, where three conduit pipes are disposed in total. In this way, when the conduit pipes 28 are disposed at the position where the distance from the center of the hot zone is equal to that of the heating unit 7 (in a concentric shape about the center of the hot zone), the conduit pipes 28 and the heating units 7 are arranged in a ring shape around the hot zone. As a result, even when the conduit pipe 28 is provided, the space of the hot zone is not narrowed. Accordingly, even when the conduit pipe 28 is provided, the space for accommodating the subject treatment material W is not sacrificed.

As illustrated in FIG. 5, the lower end portion of the conduit pipe 28 which is provided in the HIP device 1 of the fourth embodiment is connected to an external conduit pipe 35 which first guides a part of the pressure medium gas (the pressure medium gas flowing along the first circulation flow 41) cooled by the first cooling unit to the outside of the high-pressure container 2, cools the pressure medium gas at the outside of the high-pressure container 2, and the guides the pressure medium gas to the upper portion of the hot zone inside the high-pressure container 2. Specifically, the external conduit pipe 35 communicates with a gas outlet 36 which is opened to the bottom body 11 of the high-pressure container 2, and suctions the pressure medium gas circulating in the outer gas circulation path 20 which is provided between the outer casing bottom body 14 and the bottom body 11 of the high-pressure container 2.

The external conduit pipe 35 which starts from the gas outlet 36 extends from the gas outlet 36 to the outside of the high-pressure container 2 so as to penetrate the bottom body 11 from the upper side toward the lower side, and is connected to a pump 37 at the outside of the high-pressure container 2. The pump 37 is configured to pressure-feed the pressure medium gas derived from the gas outlet 36 to the outside of the high-pressure container 2 through the external conduit pipe 35 so as to return the pressure medium gas to the hot zone inside the high-pressure container 2.

In this way, the external conduit pipe 35 which passes through the pump 37 penetrates the bottom body 11 from the lower side toward the upper side again, and returns into the high-pressure container 2. The external conduit pipe 35 which returns into the high-pressure container 2 intersects again the outer gas circulation path 20 which is provided between the outer casing bottom body 14 and the bottom body 11 of the high-pressure container 2. The intersection portion in the outer gas circulation path 20, that is, the joint portion between the external conduit pipe 35 and the conduit pipe 28 is provided with an ejector 38 which suctions a part of the pressure medium gas (the pressure medium gas circulating in the first circulation flow 41) circulated by the first cooling unit, and mixes the suctioned pressure medium gas with the pressure medium gas cooled outside the high-pressure container 2.

In this way, the pressure medium gas which passes through the ejector 38 passes through the conduit pipe 28 extending upward, and reaches the upper portion of the hot zone along the inner peripheral surface of the inner casing 3, and the cooled pressure medium gas is ejected from the upper portion, whereby it is mixed with the pressure medium gas of the hot zone.

Next, the pump 37 and the ejector 38 which are provided on the path of the external conduit pipe 35 will be described in detail.

The pump 37 is provided outside the high-pressure container 2 so as to pressure-feed the pressure medium gas, and is configured to pressure-feed the pressure medium gas derived to the outside of the high-pressure container 2 so that it is returned to the hot zone inside the high-pressure container 2 again. In other words, the pump 37 constitutes an external compulsory circulation unit 39 which is provided outside the high-pressure container 2 and compulsorily circulates the pressure medium gas inside the external conduit pipe 35, and is provided in the HIP device 1 as a member different from the compulsory circulation unit 25 which compulsorily circulates the pressure medium gas circulated by the first cooling unit (the first circulation flow 41) described in the first embodiment.

As the pump 37, it is preferable to use a pressure rising compressor which is generally provided in the HIP device 1. That is, the pressure rising compressor is necessarily provided in the HIP device which performs a treatment by maintaining the pressure medium gas in a high pressure state, and hence when the pressure rising compressor is used, a new circulation pump does not need to be further provided. Further, since the pressure rising compressor is not generally used when the pressure medium gas is cooled, no problem arises in the HIP treatment even when the pressure rising compressor is used during the cooling operation. Further, when the pump 37 as the external compulsory circulation unit 39 and the fan as the compulsory circulation unit 25 are prepared as separate members, the flow rate of the pressure medium gas flowing to each unit may be independently controlled, and hence the circulation state of the pressure medium gas may be more precisely controlled.

In particular, when the external compulsory circulation unit 39 (in the example illustrated in the drawing, the pump 37) and the compulsory circulation unit 25 (in the example illustrated in the drawing, the fan 29) are individually provided, the precision degree or the responsiveness of the control may be improved compared to the case where the opening degree, the opening and closing time, and the like are controlled using a valve. Further, compared to the case of the related art in which a complex unit such as a valve is provided inside the high-pressure container without an allowable space, the structure inside the high-pressure container 2 may be also simplified, and hence the damage rate or the like of the component may be decreased.

On the other hand, the ejector 38 which is provided in the joint portion between the external conduit pipe 35 and the conduit pipe 28 suctions a part of the pressure medium gas circulated by the first cooling unit, in other words, the pressure medium gas circulating in the first circulation flow 41, and mixes the suctioned pressure medium gas with the pressure medium gas (the pressure medium gas of the external conduit pipe 35) cooled outside the high-pressure container 2 as described above. The ejector 38 is provided with plural suction ports (not illustrated) which introduces the pressure medium gas at the outside into the ejector 38, and the suction ports of the ejector 38 are provided so as to be all opened to the outer gas circulation path 20. Then, the ejector 38 is configured to mix the pressure medium gas of the outer gas circulation path 20 drawn from the suction port with the pressure medium gas flowing through the external conduit pipe 35.

When the ejector 38 is provided, a part of the pressure medium gas circulated by the first cooling unit is received, and the flow rate (the flow rate of the conduit pipe 28) of the pressure medium gas received inside the hot zone may be increased. Accordingly, it is possible to maintain a high cooling speed particularly at the last half of the cooling process in which the temperature inside the hot zone decreases.

Further, the ejector 38 is provided with an attachment and detachment coupler which divides the conduit pipe 28 and the external conduit pipe 35 as the upper and lower pipes with respect to the boundary of the installation position of the ejector 38. Further, the conduit pipe 28 is fixed to the inner casing 3 or the heating unit 7 supported by the inner casing 3, which may not be divided from each other. In this way, when the conduit pipe 28 is fixed to the inner casing 3 or the heating unit 7, the replacement work of the subject treatment material W may be easily performed as described below.

Figure 7:
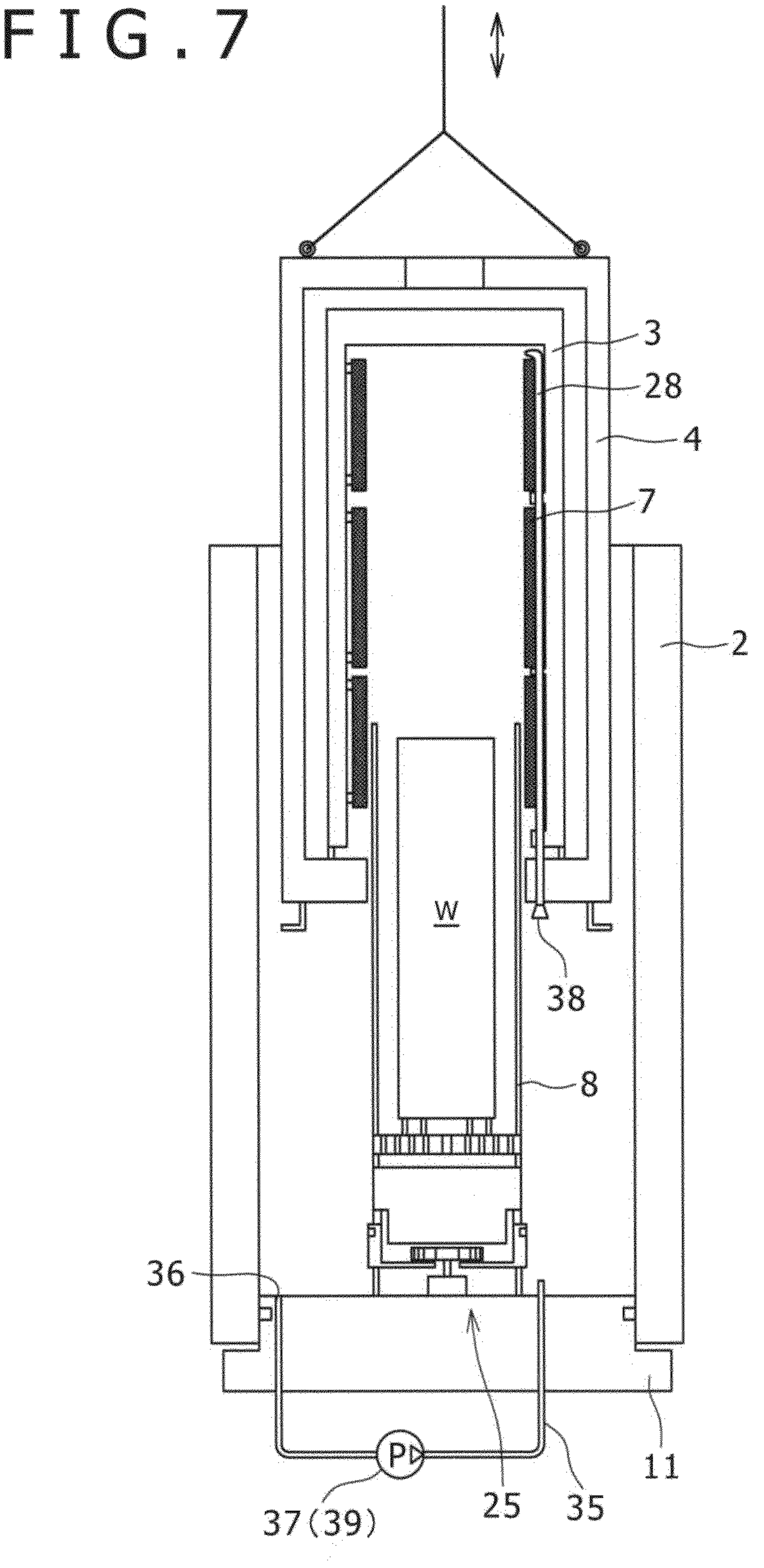
FIG. 7 is a diagram illustrating a method of replacing a subject treatment material of the hot isotropic pressure device of the fourth embodiment.

For example, as illustrated in FIG. 7, the rectification cylinder 8 is inserted into the inner casing 3 so as to be insertable thereinto and separable therefrom, and the inner casing 3 and a member such as the outer casing 4 connected to the inner casing 3 are movable together in the vertical direction. Then, the inner casing 3 may be moved with respect to the rectification cylinder 8 just by lifting the inner casing 3 (in the example illustrated in the drawing, the outer casing 4 integrated with the inner casing 3) upward by a crane or the like, and the conduit pipe 28 supported by the inner casing 3 may also move upward with the upward movement of the inner casing 3. Accordingly, the conduit pipe 28 may be reliably separated without any damage above the ejector 38 by performing a simple insertion and separation operation, and the subject treatment material W may be simply extracted or replaced.

Figure 8:
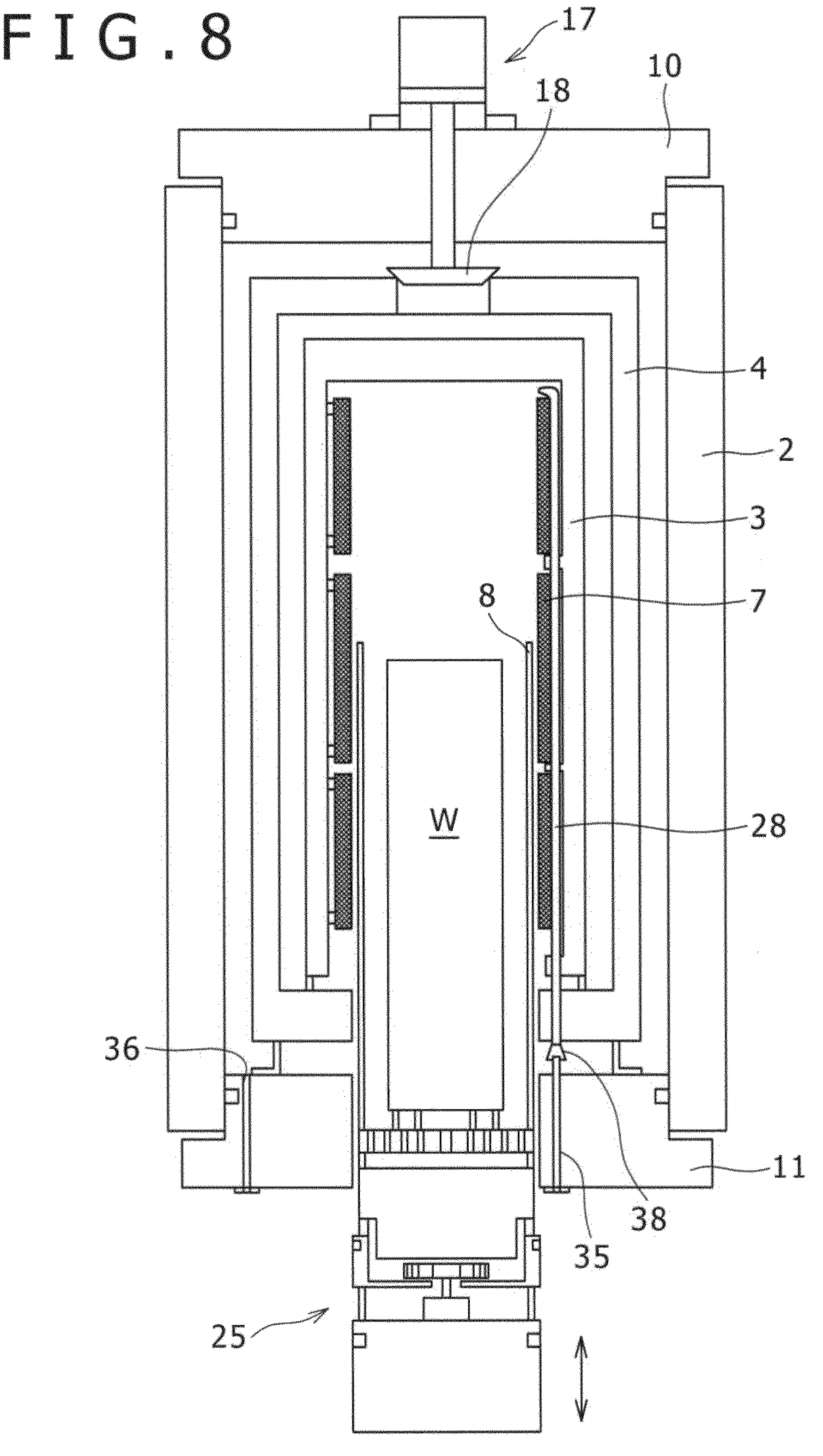
FIG. 8 is a diagram illustrating another example of the method of replacing the subject treatment material of FIG. 7.

Furthermore, in order to extract the subject treatment material W, as illustrated in FIG. 8, only the rectification cylinder 8 may be extracted downward while fixing the outer casing 4 and the inner casing 3 at the current position. In this way, even when the rectification cylinder 8 is moved downward for each subject treatment material W, the subject treatment material W may be simply extracted or replaced through a simple insertion and separation operation.

Figure 9:
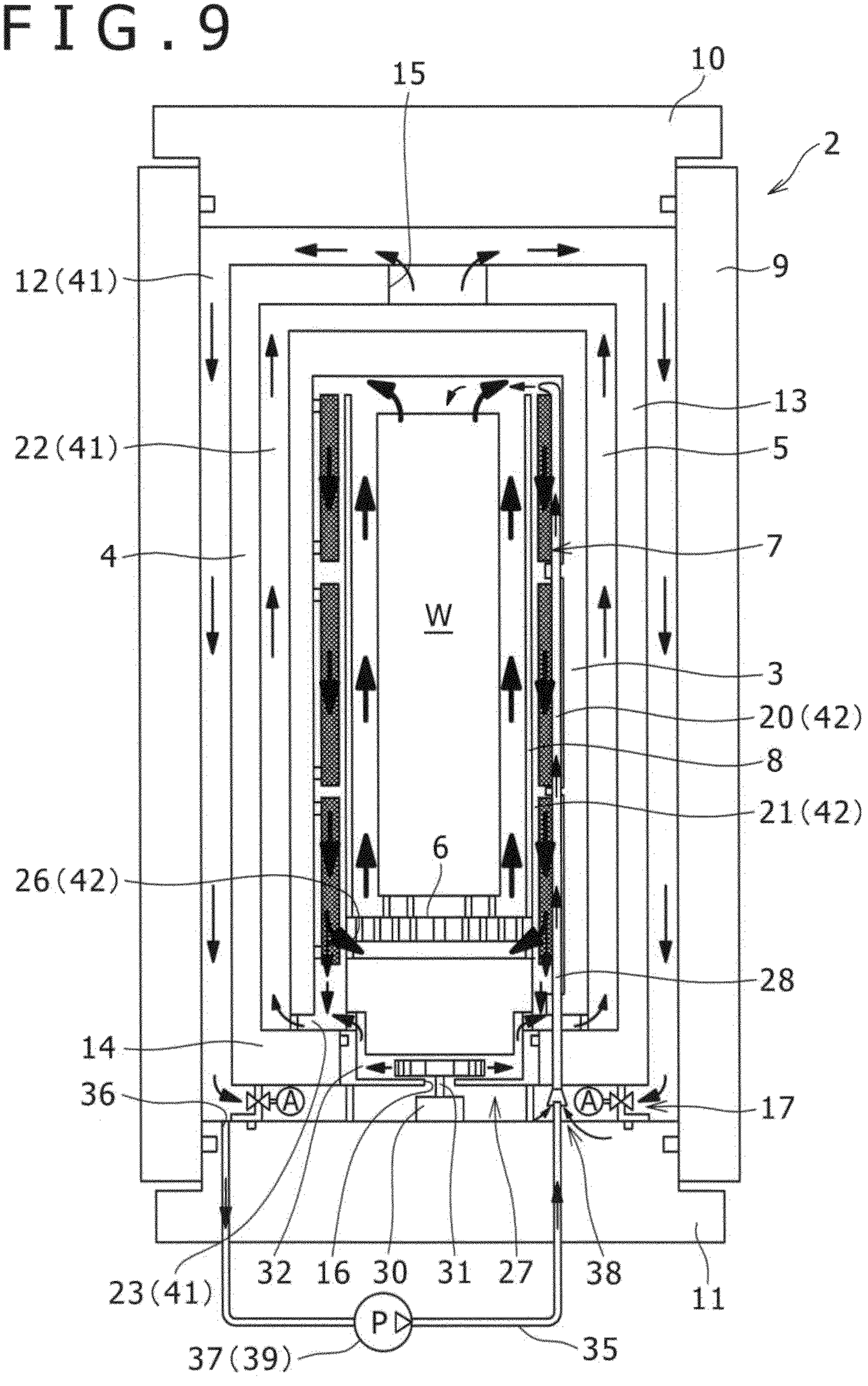
FIG. 9 is a front cross-sectional view illustrating a modified example of the hot isotropic pressure device of the fourth embodiment.

FIG. 9 is a modified example of the fourth embodiment, and the first valve unit 17 is provided in the lower portion (the outer gas circulation path 20 lower than the outer casing 4) inside the high-pressure container 2. Furthermore, in the modified example, although it is not illustrated in the drawings, the movement unit 19 which moves the lid member 18 up and down is also provided below the bottom member, so that the lid member 18 may be moved up and down from the outside of the high-pressure container 2. In this way, when the first valve unit 17 is provided at the lower side of the high-pressure container 2, the pressure medium gas flowing along the first circulation flow 41 becomes hottest particularly at the upper portion of the high-pressure container 2. Accordingly, it is possible to decrease a possibility that the first valve unit 17 having a complex structure is exposed to the high-temperature pressure medium gas and the member is broken due to the heat.

The invention is not limited to the above-described respective embodiments, and the shape, the structure, the material, the combination, and the like of the respective members may be appropriately changed in the scope not changing the spirit of the invention.

What is claimed is:

1. A hot isotropic pressure device comprising:

a high-pressure container which accommodates a subject treatment material;

a gas impermeable casing which is disposed inside the high-pressure container so as to surround the subject treatment material;

a heating unit which is provided inside the casing and forms a hot zone around the subject treatment material so as to perform an isotropic pressure treatment on the subject treatment material using a pressure medium gas inside the hot zone;

a cooling unit which guides the pressure medium gas, cooled while being guided from the upper side toward the lower side at the outside of the casing, into the hot zone so as to cool the hot zone; and a gas introducing unit which is provided in the cooling unit, wherein the gas introducing unit guides the pressure medium gas, cooled at the outside of the casing, from a lower portion of the high-pressure container to an upper portion of the hot zone without any intersection with the pressure medium gas inside the hot zone, and introduces the pressure medium gas into the hot zone.

2. The hot isotropic pressure device according to claim 1, wherein the gas introducing unit includes a conduit pipe which extends from the lower side of the hot zone to the upper portion of the hot zone and is opened at the upper portion of the hot zone, and a compulsory circulation unit which guides the pressure medium gas cooled at the outside of the casing to the upper portion of the hot zone by the conduit pipe.

3. The hot isotropic pressure device according to claim 1:

wherein the casing includes an inner casing which is disposed so as to surround the subject treatment material and an outer casing which is disposed so as to surround the inner casing from the outside, and the inner and outer casings are provided with a distance therebetween;

a rectification cylinder is disposed inside the inner casing so as to divide a space inside the inner casing into inner and outer spaces and surround the hot zone;

the cooling unit includes a first cooling unit which circulates the pressure medium gas so that the pressure medium gas, guided between the inner casing and the outer casing from the lower side toward the upper side, is guided to the outside of the outer casing at an upper portion of the outer casing, the guided pressure medium gas is cooled while being guided from the upper side toward the lower side along an inner peripheral surface of the high-pressure container, and the cooled pressure medium gas is returned between the inner casing and the outer casing at a lower portion of the outer casing, and a second cooling unit which circulates the pressure medium gas between the outside of the rectification cylinder and the inside of the rectification cylinder; and the gas introducing unit includes a conduit pipe and guides the pressure medium gas cooled by the first cooling unit to the upper portion of the hot zone so as to be joined to the pressure medium gas circulated by the second cooling unit.

4. The hot isotropic pressure device according to claim 3, wherein the second cooling unit circulates the pressure medium gas so that the pressure medium gas inside the hot zone is guided from an upper portion of the rectification cylinder to the outside of the rectification cylinder and the pressure medium gas guided to the outside is returned from the lower side of the rectification cylinder into the hot zone.

5. The hot isotropic pressure device according to claim 3, wherein the second cooling unit circulates the pressure medium gas so that the pressure medium gas outside the rectification cylinder is guided from an upper portion of the rectification cylinder into the hot zone and the pressure medium gas guided into the hot zone is returned from the lower side of the rectification cylinder to the outside of the hot zone.

6. The hot isotropic pressure device according to claim 3, wherein the conduit pipe is provided along an outer peripheral surface or an inner peripheral surface of the rectification cylinder.

7. The hot isotropic pressure device according to claim 3, wherein the conduit pipe is provided so as to penetrate a center portion of the rectification cylinder in the vertical direction.

8. The hot isotropic pressure device according to claim 3:

wherein the heating unit is divided into a plurality of heating units in the circumferential direction at the constant distance in the radial direction about the center of the hot zone; and the conduit pipe is disposed between the plurality of heating units divided in the circumferential direction at a position where a distance from the center of the hot zone in the radial direction is equal to that of the heating unit.

9. The hot isotropic pressure device according to claim 3, further comprising:

an external conduit pipe which is disposed so that a part of the pressure medium gas cooled by the first cooling unit is guided to the outside of the high-pressure container, is cooled at the outside of the high-pressure container, and is guided to the conduit pipe provided inside the high-pressure container again and is connected to a lower end portion of the conduit pipe, wherein the external conduit pipe is provided with an external compulsory circulation unit which is provided outside the high-pressure container and compulsorily circulates the pressure medium gas inside the external conduit pipe.

10. The hot isotropic pressure device according to claim 9, wherein the external compulsory circulation unit is provided separately from a compulsory circulation unit which is provided in the conduit pipe and guides the pressure medium gas cooled at the outside of the casing to the upper portion of the hot zone.

11. The hot isotropic pressure device according to claim 9, wherein a connection portion between the external conduit pipe and the conduit pipe is provided with an ejector which suctions a part of the pressure medium gas circulated by the first cooling unit and mixes the suctioned pressure medium gas with the pressure medium gas cooled at the outside of the high-pressure container.

12. The hot isotropic pressure device according to claim 3:

wherein the conduit pipe is fixed to the inner casing or the heating unit provided in the inner casing; and the conduit pipe is movable in the vertical direction with respect to the rectification cylinder while being supported by the inner casing or the heating unit.

* * * * *